US012587400B2

(12) United States Patent
Samudrala

(10) Patent No.: US 12,587,400 B2
(45) Date of Patent: Mar. 24, 2026

(54) SYSTEM AND METHOD FACILITATING ENHANCED SPATIAL CONFERENCE

(71) Applicant: JIO PLATFORMS LIMITED, Ahmedabad (IN)

(72) Inventor: Nagaraju Samudrala, Karnataka (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 442 days.

(21) Appl. No.: 18/246,439

(22) PCT Filed: Mar. 28, 2022

(86) PCT No.: PCT/IB2022/052832
§ 371 (c)(1),
(2) Date: Mar. 23, 2023

(87) PCT Pub. No.: WO2022/208310
PCT Pub. Date: Oct. 6, 2022

(65) Prior Publication Data
US 2024/0056326 A1     Feb. 15, 2024

(30) Foreign Application Priority Data

Mar. 31, 2021     (IN) .............................. 202121014972

(51) Int. Cl.
*H04L 12/66*     (2006.01)
*H04L 12/18*     (2006.01)
(Continued)

(52) U.S. Cl.
CPC ........ *H04L 12/1822* (2013.01); *H04M 3/568* (2013.01)

(58) Field of Classification Search
CPC ............... H04L 65/403; H04L 12/1822; H04L 65/4015; H04L 12/1818; H04L 12/1827;
(Continued)

(56) References Cited

U.S. PATENT DOCUMENTS 8,929,257 B1     1/2015  Goepp et al.
9,118,734 B2 *   8/2015  Kaminsky ............. H04L 65/403
(Continued)

FOREIGN PATENT DOCUMENTS

EP     3055949 A1     8/2016
EP     3055949 B1     11/2018

OTHER PUBLICATIONS

International Search Report from International Appl. No. PCT/IB2022/052832, mailed Jun. 28, 2022.

*Primary Examiner* — Kharye Pope
(74) *Attorney, Agent, or Firm* — FINNEGAN, HENDERSON FARABOW, GARRETT & DUNNER, LLP

(57) ABSTRACT

The present disclosure relates to a system and method for facilitating a robust and effective solution to an entity or an organization by enabling the entity to implement a system for enhancing user experience of a conference user in case of workflow based conference by making use of spatial conference techniques and by providing roles based privilege where a conference user can interact with other sub groups in the conference. Thus, the system and method of the present disclosure may be beneficial for both entities and users.

26 Claims, 15 Drawing Sheets

(51) Int. Cl.
H04M 3/00 (2024.01)
H04M 3/56 (2006.01)
H04M 5/00 (2006.01)

(58) Field of Classification Search
CPC ... H04L 65/1093; H04L 67/306; H04L 12/18;
H04L 67/54; H04L 63/08; H04L 43/045;
H04L 12/1813; H04M 3/56; H04M
3/568; H04M 3/564; H04M 3/567; H04M
1/2535; H04M 3/5191; H04M 3/20;
H04N 7/15; H04N 7/147; H04N 7/152;
H04N 7/157; H04N 21/4788; H04N
21/41415
See application file for complete search history.

(56) References Cited

U.S. PATENT DOCUMENTS

| | | | | |
|---|---|---|---|---|
| 10,424,297 | B1 * | 9/2019 | Carino | G10L 25/78 |
| 10,522,151 | B2 | 12/2019 | Cartwright | |
| 11,063,898 | B1 * | 7/2021 | Wu | H04N 21/632 |
| 11,343,293 | B1 * | 5/2022 | Slotznick | H04N 5/272 |
| 2016/0344567 | A1 * | 11/2016 | Navale | H04L 65/1083 |
| 2022/0191330 | A1 * | 6/2022 | Khire | H04L 12/1822 |

* cited by examiner

CONFERENCE
PARTICIPANT
102-1

CONFERENCE
PARTICIPANT
102-2

CONFERENCE
PARTICIPANT
102-N

COMPUTING DEVICE 1
104-1

COMPUTING DEVICE 2
104-2

COMPUTING DEVICE N
104-N

NETWORK
106

ENTITY
108

SYSTEM
110

AI ENGINE
214

CENTRALIZED SERVER
112

SYSTEM
110 /
CENTRALIZED SERVER
112

| PROCESSOR(S) 202 | MEMORY 204 | INTERFACE(S) 206 |

PROCESSING ENGINE
208

| ACQUISITION ENGINE 212 | AI ENGINE 214 |

OTHER ENGINE(S)
216

DATABASE
210

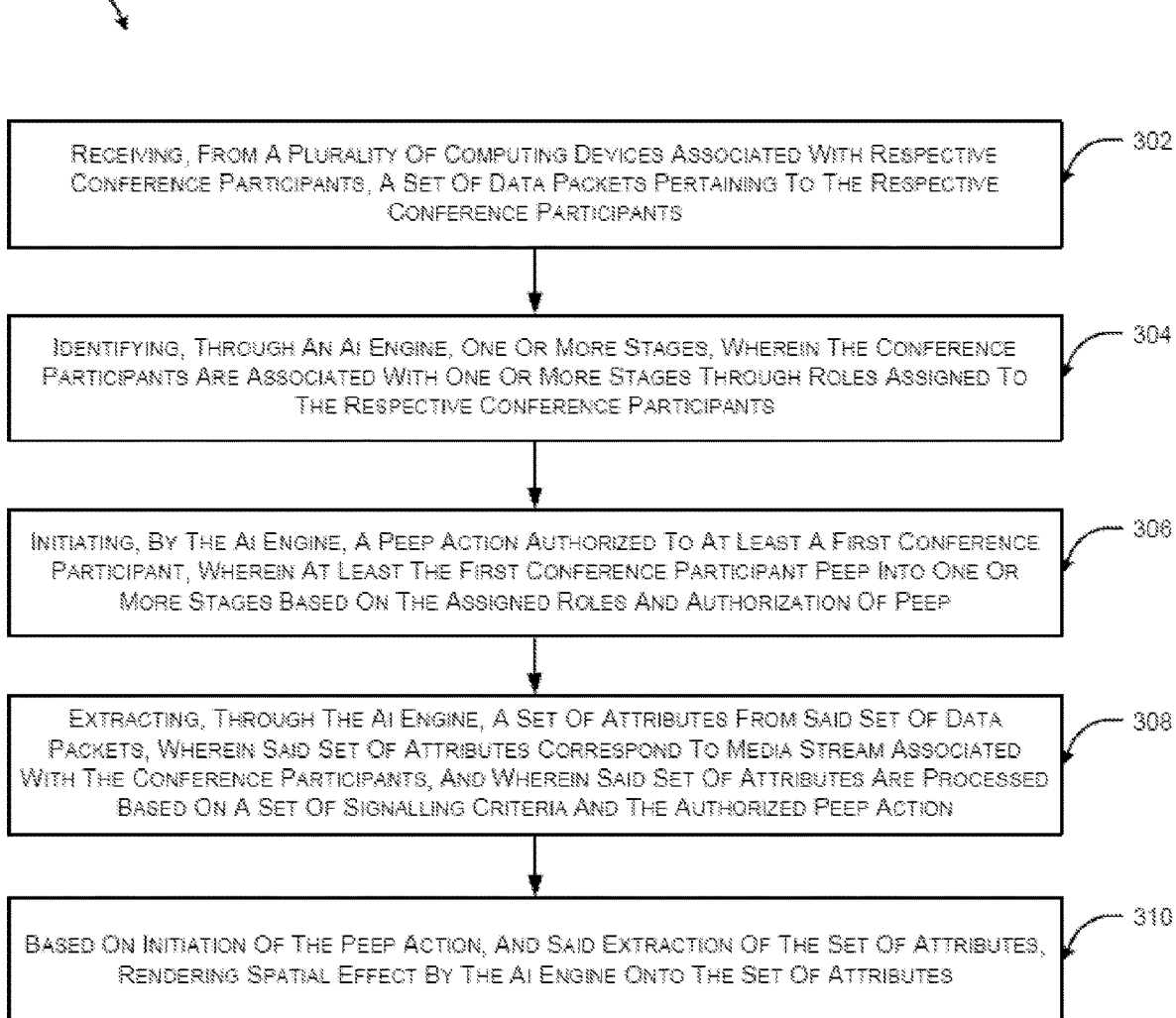

300

RECEIVING, FROM A PLURALITY OF COMPUTING DEVICES ASSOCIATED WITH RESPECTIVE CONFERENCE PARTICIPANTS, A SET OF DATA PACKETS PERTAINING TO THE RESPECTIVE CONFERENCE PARTICIPANTS — 302

IDENTIFYING, THROUGH AN AI ENGINE, ONE OR MORE STAGES, WHEREIN THE CONFERENCE PARTICIPANTS ARE ASSOCIATED WITH ONE OR MORE STAGES THROUGH ROLES ASSIGNED TO THE RESPECTIVE CONFERENCE PARTICIPANTS — 304

INITIATING, BY THE AI ENGINE, A PEEP ACTION AUTHORIZED TO AT LEAST A FIRST CONFERENCE PARTICIPANT, WHEREIN AT LEAST THE FIRST CONFERENCE PARTICIPANT PEEP INTO ONE OR MORE STAGES BASED ON THE ASSIGNED ROLES AND AUTHORIZATION OF PEEP — 306

EXTRACTING, THROUGH THE AI ENGINE, A SET OF ATTRIBUTES FROM SAID SET OF DATA PACKETS, WHEREIN SAID SET OF ATTRIBUTES CORRESPOND TO MEDIA STREAM ASSOCIATED WITH THE CONFERENCE PARTICIPANTS, AND WHEREIN SAID SET OF ATTRIBUTES ARE PROCESSED BASED ON A SET OF SIGNALLING CRITERIA AND THE AUTHORIZED PEEP ACTION — 308

BASED ON INITIATION OF THE PEEP ACTION, AND SAID EXTRACTION OF THE SET OF ATTRIBUTES, RENDERING SPATIAL EFFECT BY THE AI ENGINE ONTO THE SET OF ATTRIBUTES — 310

FIG. 3

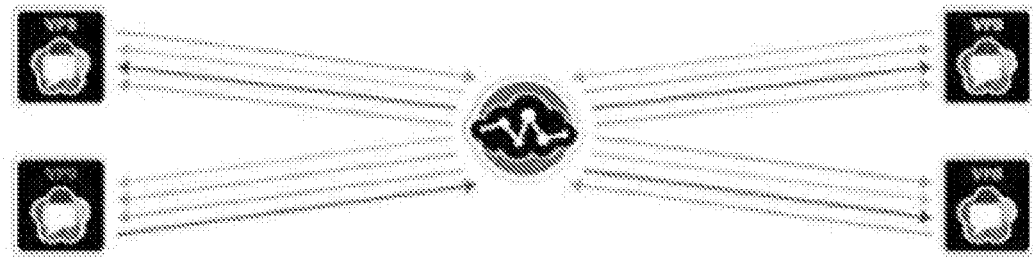
FIG. 10C
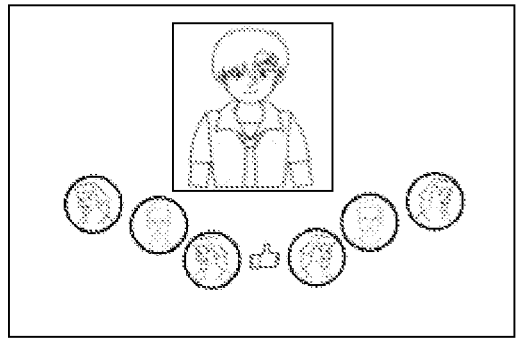
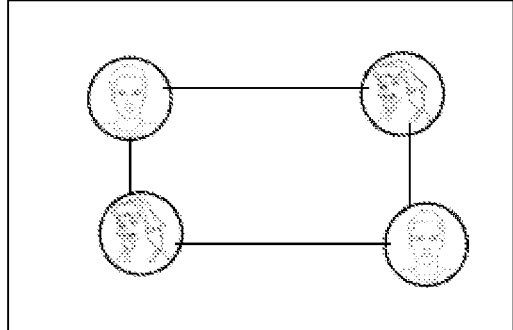
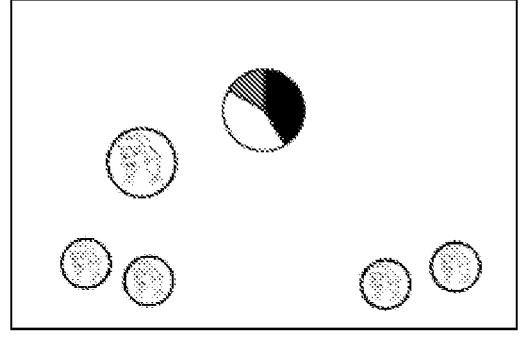
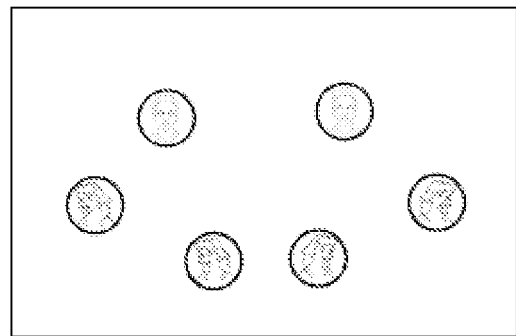
FIG. 10D

1100

EXTERNAL STORAGE
DEVICE
1110

MAIN MEMORY
1130

READ-ONLY
MEMORY
1140

MASS STORAGE
DEVICE
1150

Bus 1120

COMMUNICATION
PORT(S)
1160

PROCESSOR
1170

SYSTEM AND METHOD FACILITATING ENHANCED SPATIAL CONFERENCE

RESERVATION OF RIGHTS

FIELD OF INVENTION

The embodiments of the present disclosure generally relate to the field of tele-communication. More particularly, the present disclosure relates to a system and method for facilitating spatialized audio and video in conference calls.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In today's world, conference calls are becoming an increasingly common communications medium. For example, a large corporation can have offices located throughout the world, but the corporation's employees at different locations are often required to consult with each other by conference call, in order to develop conclusions and solutions for pressing problems.

With the advent of large virtual conference rooms as illustrated in FIGS. 10A-which can accommodate hundreds of participants, it would be a boring experience where everyone talks to everyone else in the conference session. Moreover, the conventional conference call systems in use today utilize a single voice channel for all participants, and a moderator typically controls the conference calls. Hence, a user can participate in only one conference call at a time. There are other problems associated with making calls such as during a conference call, it is often difficult to recognize who is speaking by voice alone. If there are several other participants in the conference call with similar regional accents or voices that sound similar, the conference call might become a chaos. Furthermore, two or more conference call participants can be speaking at the same time, which degrades the conversations. Another problem with existing conference call approaches is that they do not make it possible to divide a conference call into a number of sub-conferences, and also to allow participants to move freely between the sub-conferences. Moreover, engagement of users in large conference is one to many scenarios at this point of time and do not make use of spatial conference techniques.

There is therefore a need in the art to provide a system and a method that can facilitate making a conference call appealing to real life use cases using spatial conference call.

OBJECTS OF THE PRESENT DISCLOSURE

Some of the objects of the present disclosure, which at least one embodiment herein satisfies are as listed herein below.

It is an object of the present disclosure to enhance the user experience in case of workflow based conference by making use of spatial conference techniques.

It is an object of the present disclosure to provide roles based privilege where a conference user interacts with other sub groups in the conference.

SUMMARY

This section is provided to introduce certain objects and aspects of the present invention in a simplified form that are further described below in the detailed description. This summary is not intended to identify the key features or the scope of the claimed subject matter.

In an aspect, the proposed system is configured to generate an executable bot application specific to an entity, where the system comprises a processor that executes a set of executable instructions that are stored in a memory, upon which execution, the processor causes the system to receive, from a plurality of computing devices associated with respective conference participants, a set of data packets pertaining to the respective conference participants, identify, through an AI engine, one or more stages, wherein the conference participants may be associated with said one or more stages through roles assigned to the respective conference participants, initiate, by the AI engine, a peep action authorized to at least a first conference participant, wherein at least the first conference participant may peep into one or more stages based on the assigned roles and authorization of peep action, extract, through the AI engine, a set of attributes from the set of data packets, wherein said set of attributes may correspond to media stream associated with the conference participants, and wherein the set of attributes may be processed based on a set of signalling criteria and the authorized peep action and based on the initiation of the peep action, and the extraction of the set of attributes, render spatial effect by the AI engine onto the set of attributes.

The present disclosure further provides for a method for generating an executable bot application specific to an entity, where the method comprises the steps of: receiving, from a plurality of computing devices associated with respective conference participants, a set of data packets pertaining to the respective conference participants, identifying, through an AI engine, one or more stages, wherein the conference participants may be associated with said one or more stages through roles assigned to the respective conference participants, initiating, by the AI engine, a peep action authorized to at least a first conference participant, wherein at least the first conference participant may peep into one or more stages based on the assigned roles and authorization of peep action, extracting, through the AI engine, a set of attributes from the set of data packets, wherein said set of attributes may correspond to media stream associated with the conference participants, and wherein the set of attributes may be processed based on a set of signalling criteria and the authorized peep action and based on the initiation of the peep action, and the extraction of the set of attributes, rendering spatial effect by the AI engine onto the set of attributes.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 3 illustrates exemplary method flow diagram for enhancing spatial conference call, in accordance with an embodiment of the present disclosure.

FIGS. 10A-10E illustrate representations of the existing workflow, in accordance with embodiments of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The present invention provides a robust and effective solution to an entity or an organization by enabling the entity to implement a system for enhancing user experience of a conference user in case of workflow based conference by making use of spatial conference techniques and by providing roles based privilege where a conference user can interact with other sub groups in the conference. Thus, the system and method of the present disclosure may be beneficial for both entities and users.

Figure 1:
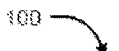
FIG. 1 illustrates an exemplary network architecture in which or with which the system of the present disclosure can be implemented for facilitating enhanced conference call, in accordance with an embodiment of the present disclosure

Referring to FIG. 1 that illustrates an exemplary network architecture (100) in which or with which system (110) of the present disclosure can be implemented, in accordance with an embodiment of the present disclosure. As illustrated in FIG. 1, by way of example and not by not limitation, the exemplary architecture (100) may include a plurality of conference participants (102-1, 102-2 . . . 102-N) (collectively referred to as conference participants (102) or users (102) or participants (102) and individually as conference participant (102) or user (102) or participant (102)). associated with a plurality of user computing devices (104-1, 104-2, . . . 104-N) (also referred to as user devices (104) collectively and user device (104) individually), at least a network 106, at least a centralized server 110 and at least a second computing device (104) associated with an entity (108). More specifically, the exemplary architecture (100) includes a system (110) equipped with an artificial intelligence (AI) engine (214) for enhancing spatial conference calls for conference participants (102). The user device (104) may be communicably coupled to the centralized server (112) through the network (106) to facilitate communication therewith. As an example and not by way of limitation, the user computing device (104) may be operatively coupled to the centralised server (112) through the network (106) and may be associated with the entity (108). The system (110) may receive a set of data packets pertaining to the respective conference participants from a plurality of computing devices (104) associated with respective conference participants (102). The AI engine (214) operatively coupled to the system (110) may identify one or more stages associated with the conference participants through roles assigned to the respective conference participants. The system (110) with the help of the AI engine (214) may initiate a peep action authorized to at least a first conference participant (102-1) with which the first conference participant may peep into one or more stages based on the assigned roles and authorization of peep action. The AI engine (214) may further cause the system (110) to extract a set of attributes from the set of data packets corresponding to media stream associated with the conference participants (102). The set of attributes may be processed based on a set of signalling criteria and the authorized peep action, and based on the initiation of the peep action, and the extraction of the set of attributes, the AI engine (214) may render spatial effect onto the set of attributes.

In an embodiment, the set of attributes corresponding to the media stream may include any or a combination of audio data, video data and conference related data.

In another embodiment, the one or more stages may be indicative of tasks associated with the conference participants, where each stage of the one or more stages may correspond to a predefined task associated with the conference participants (102).

In an embodiment, the AI engine (214) may be configured to assign privileged roles to at least a first conference participant (102-1) and at least a second conference participant (102-2). The privileged roles may be assigned to control access of the one or more stages, the assignment being performed automatically based on the media stream of respective conference participants and real-time queries being generated by the conference participants (102) in view of their respective roles, and where at least the first and the second conference participants (102-1, 102-2) with the assigned privileged roles control tasks generated in the plurality of stages. In an embodiment, upon a confirmed assignment of the privileged roles to the first and second conference participant (102-1 and 102-2), the system (110) may transmit a first set of data packets indicative of confirmation of assignment of the conference participant, in response to which, the computing device (104) of the conference participant (102) may transmit a second set of data packets indicative of acknowledgement of the confirmation.

In yet another embodiment, at least the first and the second conference participants (102-1 and 102-2) with the assigned privileged roles may enter a pre-defined stage among the plurality of stages based on a set of pre-defined rules, and where remaining conference participants (102) without privileged roles participate in all the plurality of stages.

In yet another embodiment, the roles may be assigned to the respective conference participants (102) based on a set of pre-defined role requirement rules.

In another embodiment, a media mixer server may be operatively coupled to the system (110). The media mixer server may be configured to combine the media stream associated with the respective conference participants (102) into a single media stream.

In an embodiment, upon a request for initiation of the peep action by the at least the first conference participant (102-1), the system may transmit a third set of data packets indicative of request for initiation of peep action by the at least the first conference participant (102-1), in response to which, the computing device (102-1) of at least the first conference participant (102-1) may transmit a fourth set of data packets indicative of acknowledgement of the request.

In another embodiment, the conference participants of a first stage interact with other conference participants of the first stage and where conference participants of a second stage interact with other conference participants of the second stage. In an embodiment, at least the first conference participant of a first stage may interact with at least a second conference participant of at least a second or more stages through initiation of peep action by at least the first conference participant and where the at least the first conference participant may return to the first stage after completion of the peep action.

In yet another embodiment, upon authorization of the peep action initiated by at least the first conference participant (102-1) for the at least second or more stages, the conference participants of the at least second or more stages receive media stream pertaining to at least the first conference participant initiating the peep action.

In yet another embodiment, once the peep action may be authorized for at least the first conference participant for the second or more stages, the media stream in the second or more stages changes, and effects associated with media stream for the plurality of conference participants of the second or more stages may reduce and effects associated with media stream of the at least first conference participant for the second or more stages may increase.

In an embodiment, the user computing device (104) may communicate with the system (110) via set of executable instructions residing on any operating system, including but not limited to, Android™, iOS™, Kai OS™ and the like. In an embodiment, user computing device (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the user computing device (104) may not be restricted to the mentioned devices and various other devices may be used. A smart computing device may be one of the appropriate systems for storing data and other private/sensitive information.

In an exemplary embodiment, a network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
FIG. 2 illustrates an exemplary representation of system/centralized server for facilitating enhanced conference call based on an artificial intelligence (AI) based architecture, in accordance with an embodiment of the present disclosure

In an embodiment, the system (110) may include one or more processors coupled with a memory, wherein the memory may store instructions which when executed by the one or more processors may cause the system to facilitate enhanced conference call. FIG. 2 with reference to FIG. 1, illustrates an exemplary representation of system (110)/centralized server (112) for facilitating enhanced conference call based on an artificial intelligence (AI) based architecture, in accordance with an embodiment of the present disclosure. In an aspect, the system (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the system (110). The memory (206) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an embodiment, the system (110)/centralized server (112) may include an interface(s) 204. The interface(s) 204 may comprise a variety of interfaces, for example, interfaces for data input and output devices, referred to as I/O devices, storage devices, and the like. The interface(s) 204 may facilitate communication of the system (110). The interface(s) 204 may also provide a communication pathway for one or more components of the system (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110)/centralized server (112) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a data acquisition engine (212), an artificial intelligence (AI) engine (214), and other engines (216).

In an embodiment, the data acquisition engine (212) may be configured to receive a set of data packets pertaining to the respective conference participants from a plurality of computing devices (104) associated with respective conference participants (102).

The AI engine (214) operatively coupled to the system (110) may identify one or more stages associated with the conference participants through roles assigned to the respective conference participants and further may initiate a peep action authorized to at least a first conference participant (102-1) with which the first conference participant may peep into one or more stages based on the assigned roles and authorization of peep action. The AI engine (214) may then extract a set of attributes from the set of data packets corresponding to media stream may include any or a combination of audio data, video data and conference related data associated with the conference participants (102). The set of attributes may be processed based on a set of signalling criteria and the authorized peep action. The AI engine may render spatial effect onto the set of attributes based on the initiation of the peep action, and the extraction of the set of attributes.

The AI engine (214) may further configure the one or more stages indicative of tasks associated with the conference participants to correspond to a predefined task associated with the conference participants (102) and assign privileged roles to at least a first conference participant (102-1) and at least a second conference participant (102-2). The privileged roles may be assigned to control access of the one or more stages, the assignment being performed automatically based on the media stream of respective conference participants and real-time queries being generated by the conference participants (102) in view of their respective roles, and where at least the first and the second conference participants (102-1, 102-2) with the assigned privileged roles control tasks generated in the plurality of stages. In an embodiment, upon a confirmed assignment of the privileged roles to the first and second conference participant (102-1 and 102-2), the system (110) may transmit a first set of data packets indicative of confirmation of assignment of the conference participant, in response to which, the computing device (104) of the conference participant (102) may transmit a second set of data packets indicative of acknowledgement of the confirmation.

In yet another embodiment, at least the first and the second conference participants (102-1 and 102-2) with the assigned privileged roles may enter a pre-defined stage among the plurality of stages based on a set of pre-defined rules as configured by the AI engine (214), and where remaining conference participants (102) without privileged roles participate in all the plurality of stages. The roles may be assigned to the respective conference participants (102) based on a set of pre-defined role requirement rules.

In another embodiment, the AI engine (214) may configure a media mixer server may be operatively coupled to the system (110) to combine the media stream associated with the respective conference participants (102) into a single media stream.

In an embodiment, upon a request for initiation of the peep action by the at least the first conference participant (102-1), the AI engine (214) may transmit a third set of data packets indicative of request for initiation of peep action by the at least the first conference participant (102-1), in response to which, the computing device (102-1) of at least the first conference participant (102-1) may transmit a fourth set of data packets indicative of acknowledgement of the request. The AI engine (214) may further enable the conference participants of a first stage to interact with other conference participants of the first stage and where conference participants of a second stage interact with other conference participants of the second stage. In an embodiment, at least the first conference participant of a first stage may interact with at least a second conference participant of at least a second or more stages through initiation of peep action by at least the first conference participant and where the at least the first conference participant may return to the first stage after completion of the peep action. Upon authorization of the peep action initiated by at least the first conference participant (102-1) for the at least second or more stages, the conference participants of the at least second or more stages may receive media stream pertaining to at least the first conference participant initiating the peep action.

In yet another embodiment, once the peep action may be authorized for at least the first conference participant for the second or more stages, the media stream in the second or more stages changes as configured by the AI engine (214), and effects associated with media stream for the plurality of conference participants of the second or more stages may reduce and effects associated with media stream of the at least first conference participant for the second or more stages may increase.

FIG. 3 illustrates exemplary method flow diagram (300) for enhancing spatial conference call, in accordance with an embodiment of the present disclosure. At 302, the method may include the step of receiving, from a plurality of computing devices associated with respective conference participants, a set of data packets pertaining to the respective conference participants and at 304, the method (300) may further include the step of identifying, through an AI engine, one or more stages, wherein the conference participants may be associated with one or more stages through roles assigned to the respective conference participants.

Further, the method (300) may include at 306 the step of initiating, by the AI engine, a peep action authorized to at least a first conference participant, wherein at least the first conference participant may peep into one or more stages based on the assigned roles and authorization of peep and at 308 the step of extracting, through the AI engine, a set of attributes from the set of data packets associated with the conference participants, and wherein the set of attributes are processed based on a set of signalling criteria and the authorized peep action.

Furthermore, based on initiation of the peep action, and said extraction of the set of attributes, the method may include at 310, the step of rendering spatial effect by the AI engine onto the set of attributes.

Figure 4A:
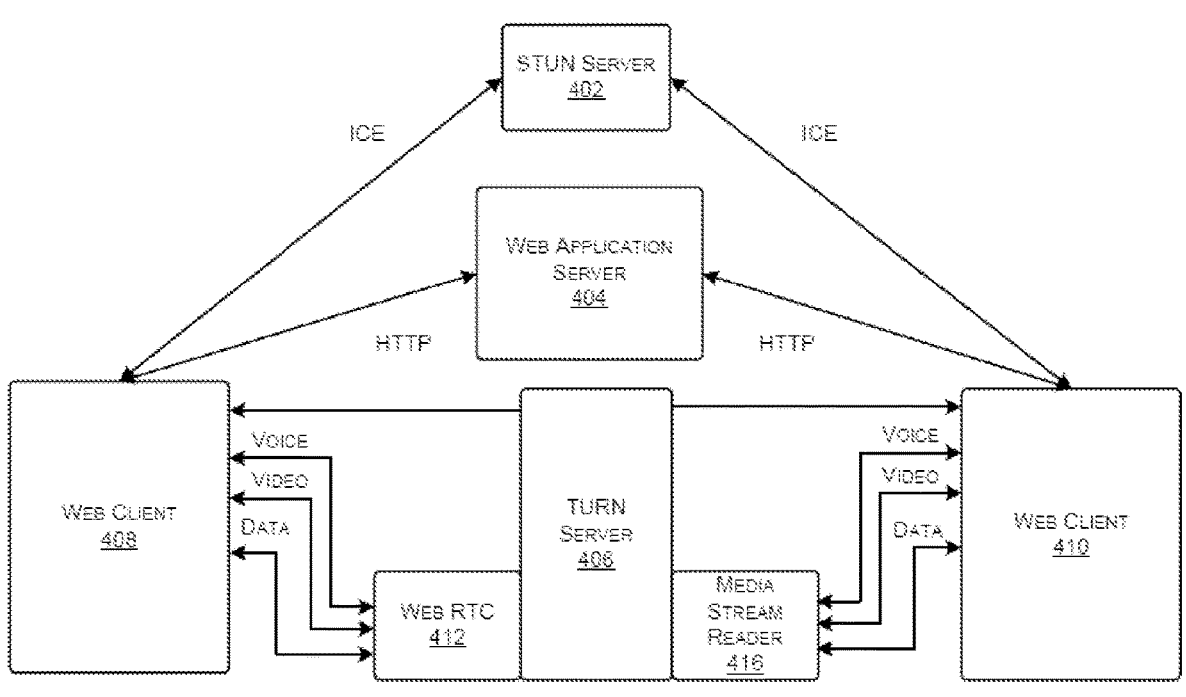
FIGS. 4A-4B illustrate exemplary block flow diagrams (400) depicting components of a selective forward architecture involved in enhancing a spatial conference call, in accordance with an embodiment of the present disclosure.
Figure 4B:
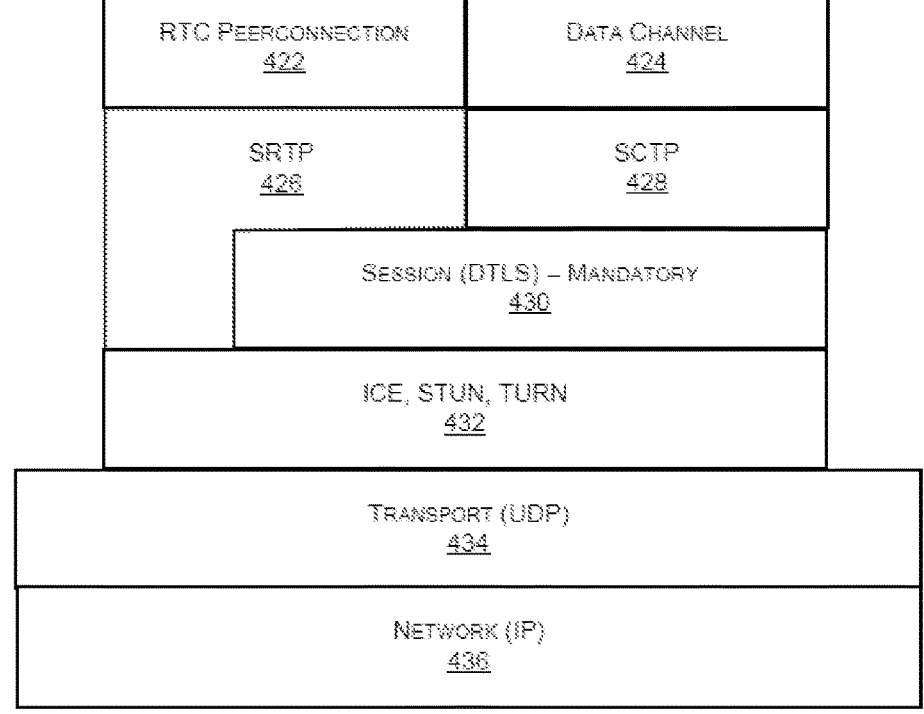

FIGS. 4A-4B illustrate exemplary block flow diagrams (400) depicting components of a selective forward architecture involved in enhancing spatial conference call, in accordance with an embodiment of the present disclosure.

Figure 5:
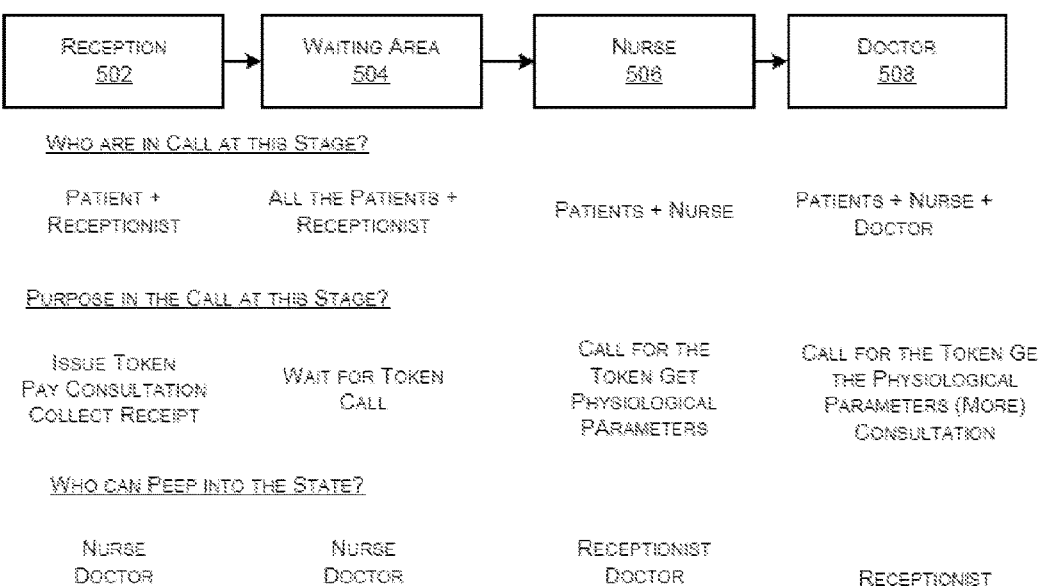
FIG. 5 illustrates a representation for exemplary overview of a workflow implementation, in accordance with an embodiment of the present disclosure.

FIG. 5 illustrates are presentation (500) for exemplary overview of a workflow implementation, in accordance with an embodiment of the present disclosure. As shown in FIG. 5, the workflow may include the following blocks including the following stages Receptionist (502), Waiting (504), Nurse (506), and Doctor (508) but not limited to the like and multiple roles may be defined for the stages as Receptionist, Nurse, Patient, Doctor respectively. Some stages may be privileged where a person needs to wait in a and can only be admitted by a stage owner. For example, a doctor can be a privileged state and a person can be admitted to the next stage by the doctor or a nurse. One or more person of each role type can be present at a stage. A person from other stage can peep into other unprivileged stage for a short conversation and return. So, voice of a person in a stage may be audible with good volume. But the volume of another person in another stage will be relatively less. For example, patient and receptionist may be in call in the receptionist stage (502). In the receptionist stage (502), token can be issued, consultation can be paid, and receipt can be collected but not limited to the like. A nurse, a doctor or other patient can peep in to the receptionist stage (502). In the waiting stage (504), all patients and the receptionist may be on call. The patients wait for the token call and the doctor, the nurse and the receptionist can peep in to the waiting stage (504). In the nursing stage (506), call for the token takes place and physiological parameters may be checked. The receptionist, the doctor and the nurse can peep into this stage (506). I the doctor stage (508), the doctor, the nurse and the patient can be in call. Call for the token takes place and more physiological parameters are checked and consultation may happen. The receptionist can peep into the doctor stage (508).

FIGS. 6A-6F illustrate a generic architecture of implementations of exemplary workflow conference with multiple sub-conferences (or) stages, in accordance with an embodiment of the present disclosure.

Figure 6A:
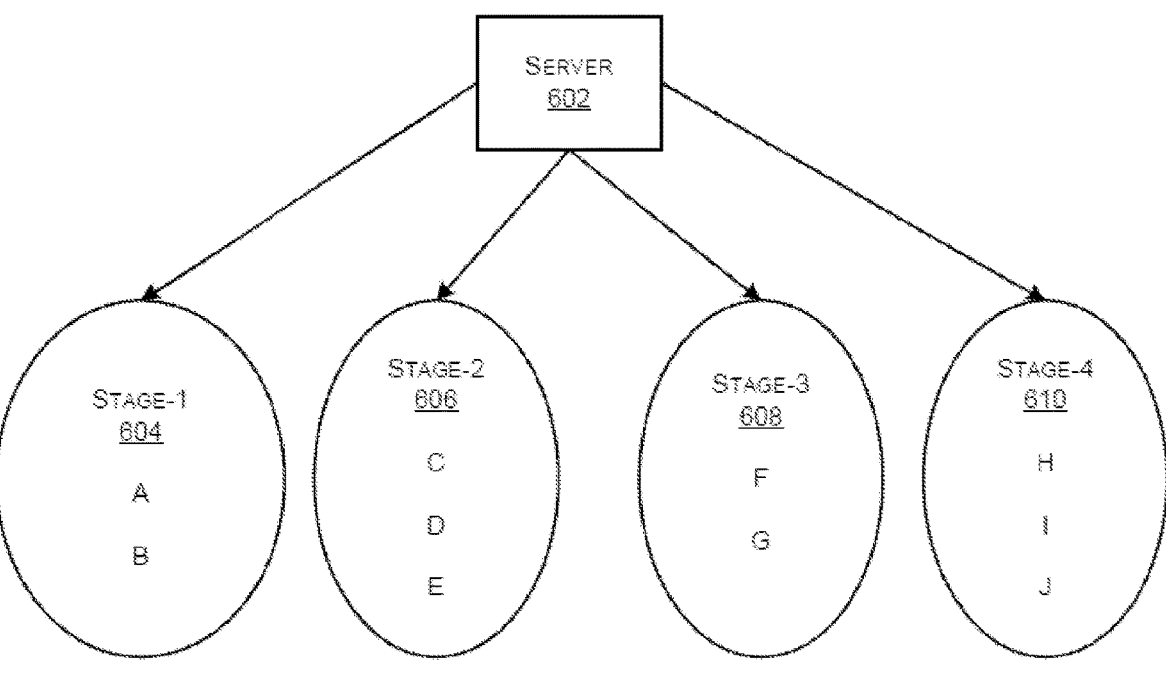
FIGS. 6A-6F illustrate a generic architecture of implementations of exemplary workflow conference with multiple sub-conferences (or) stages, in accordance with an embodiment of the present disclosure.

As illustrated in FIG. 6A, in an aspect, a workflow may be include a plurality of stages, each of which may be a local sub conference in itself. As depicted, the workflow conference may be defined with at least 4 stages, stage 1 (604), stage 2 (606), stage 3 (608) and stage 4 (610) and each of the plurality of stages may be coupled to a server (602). For example, the stage 1 (604) may include conference participants A and B but not limited to the like. The stage 2 (606) may include conference participants C, D and E. The stage 3 (608) may include conference participants F and G and the stage 4 (610) may include conference participants H, J and K. In the stage 1, 2 (604, 606), the conference participants A, B and C, D and E may be present who can talk to each other in that stage. But, if a conference participant (F or G) from stage 3 (608) wants to talk to stage 1 (604), conference participant F or G needs to peep into stage 1 (604).

Figure 6B:
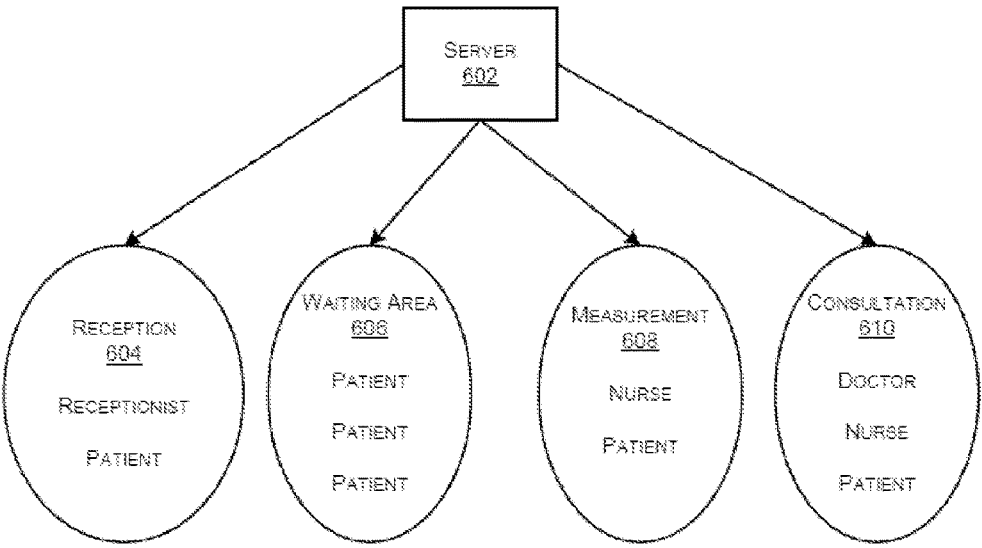

As illustrated in FIG. 6B, the generic workflow conference with stages (local sub conferences) illustrated in FIG. 6A can be explained using the doctor consultation use case. Since the conference call may be a SFU implementation, all the media streams from each person may be made available to another person. It is up to the device to allow the audio/video from another stage and render media based on the signalling from the server (602). Signalling may indicate which media would be rendered. If any person from another stage peeps, then spatial chat would be made use and appropriate audio effect would be rendered.

Figure 6C:
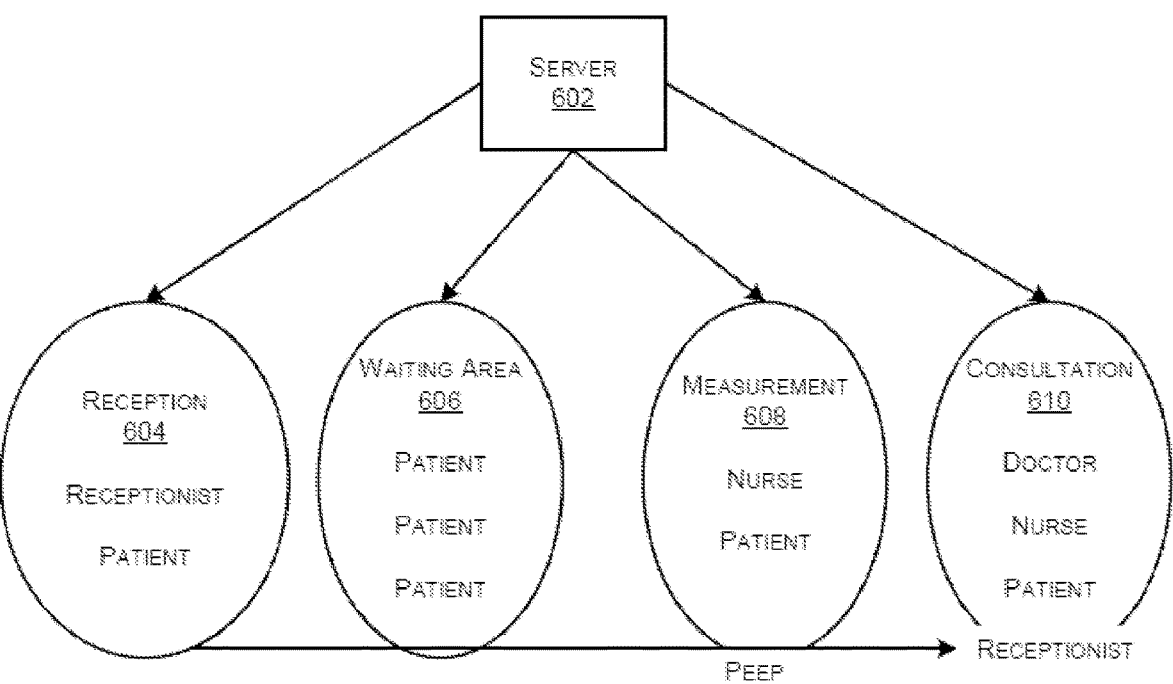
Figure 6D:
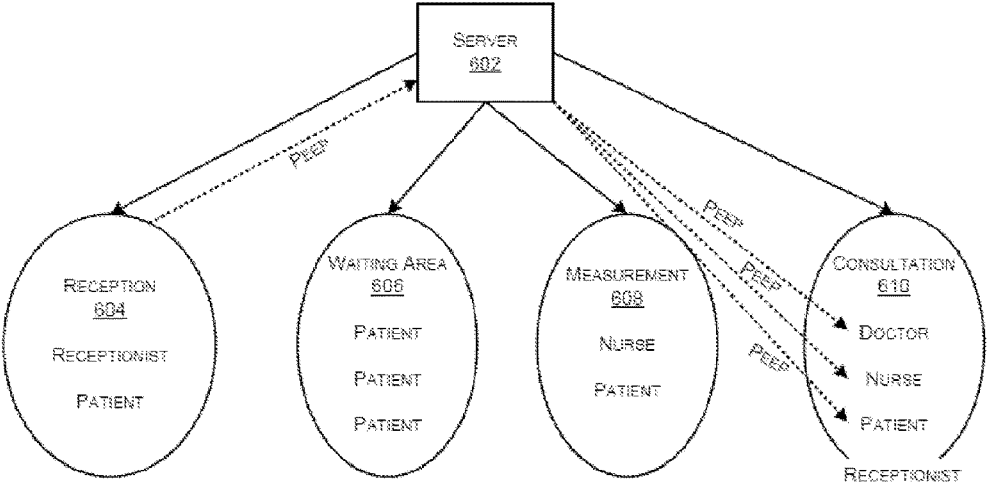
Figure 6E:
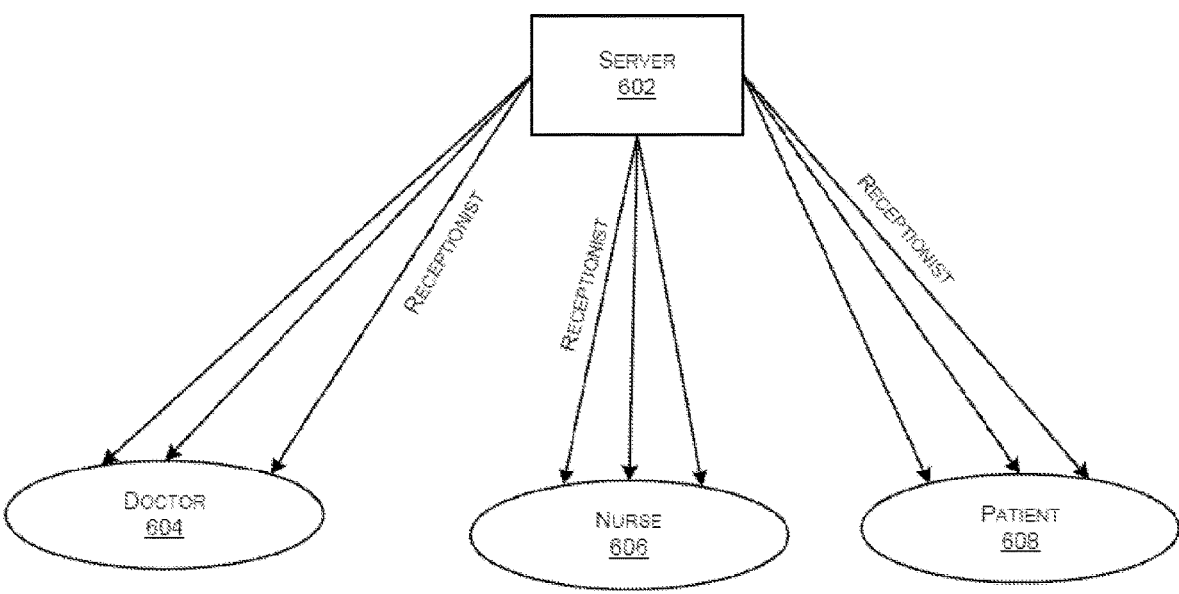
Figure 6F:
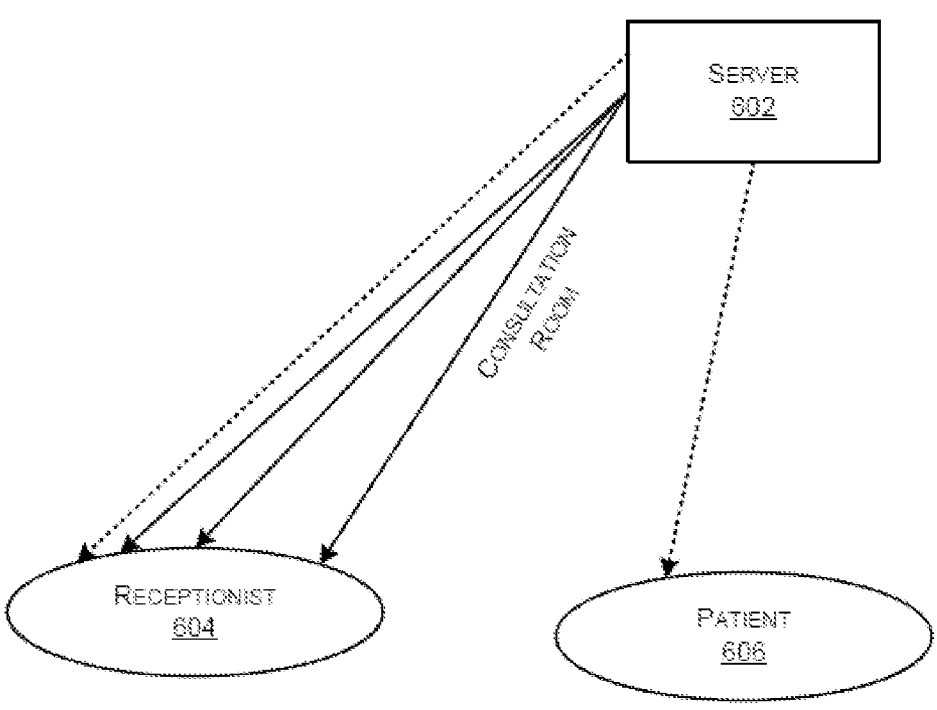

FIG. 6C illustrates as a way of example and not as a limitation a case where the receptionist peep into the consultation room and does a spatial chat while FIG. 6D illustrates a way of example and not as a limitation a case where receptionist peep into the consultation room and does a spatial chat. FIG. 6E illustrates a way of example and not as a limitation a case where consultation room participants receive the media stream of the receptionist once the peep request is accepted. Peep media stream may be sent from 602 to 606, 602 to 608, 602 to 610 for the consultation room participants. FIG. 6F 6E illustrates a way of example and not as a limitation a case where once the receptionist peeps into the consultation room, media handling with reception room participants may change. The changes that may take place in the reception room participants may include the receptionist would experience the changes, the audio of the patient may be spatially controlled with less volume, the audio of the consultation room participant may be controlled with regular volume, patients may experience spatial audio rendering affect for the receptionist with low volume and the like.

Figure 7:
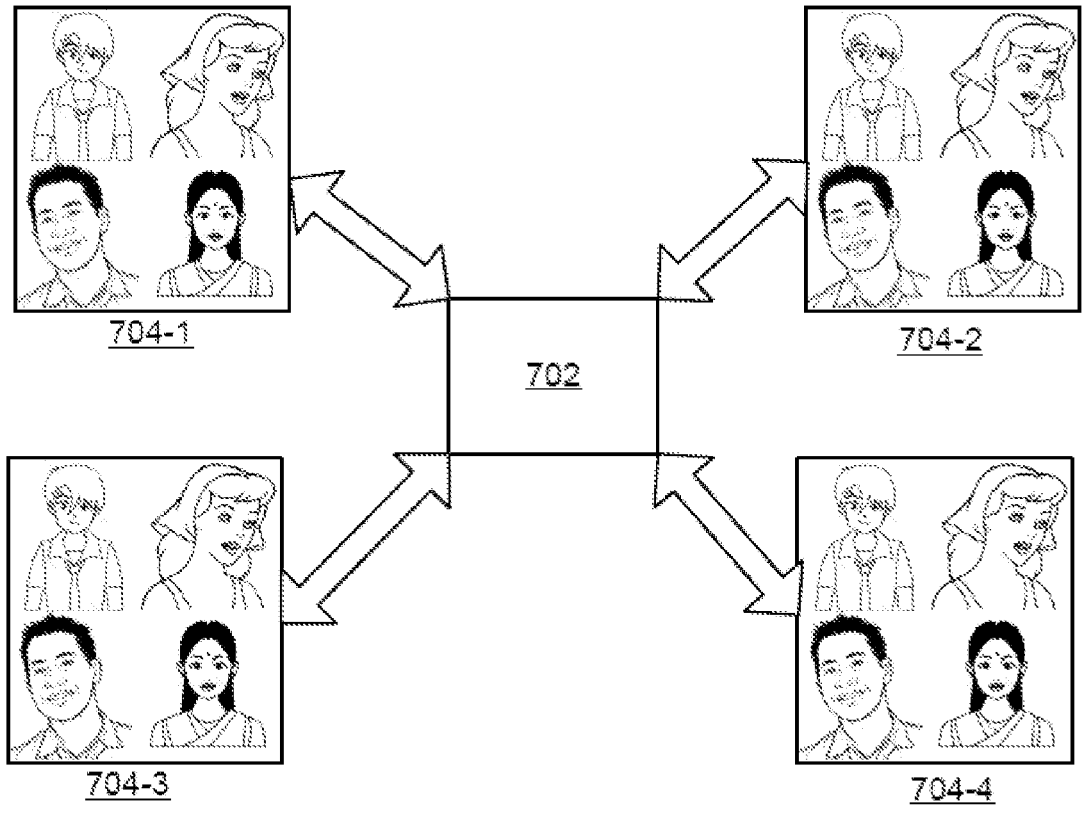
FIG. 7 illustrates an exemplary system architecture associated with a Media Mixer in accordance with an embodiment of the present disclosure.

FIG. 7 illustrates an exemplary system architecture associated with a Media Mixer in accordance with an embodiment of the present disclosure.

As illustrated, system architecture can make use of a Media Mixer (702). The Media Mixer may be a server combining individual media and prepare a single media stream instead of the SFU architecture. The Media Mixer (702) may include at least four stages 704-1, 704-2, 704-3 and 704-4. The at least four stages may include a plurality of conference participants. The plurality of conference participants may include a moderator that may be indicative of a participant with privileges, participants who joined a conference, a local conference group that may correspond to a set of people who may be talking or engaged with each other, local conference indicative of a conference for a local conference group, local participants indicative of persons part of local conference group, global conference indicative of a global set of participants, group transition indicative, local-local transition, local-global transition indicative of workflow transition.

Figure 8A:
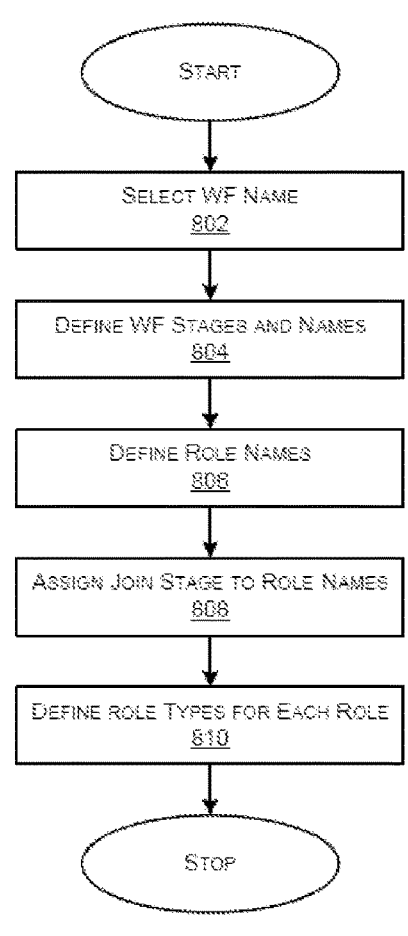
FIGS. 8A-8C illustrate exemplary flow diagrams representing workflow creation, joining and usage, in accordance with an embodiment of the present disclosure.
Figure 8B:
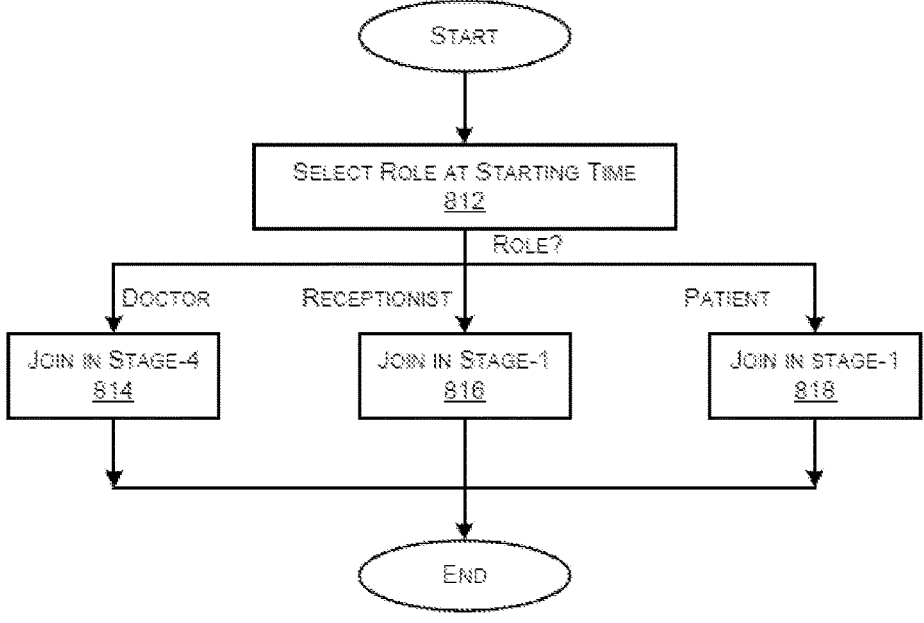
Figure 8C:
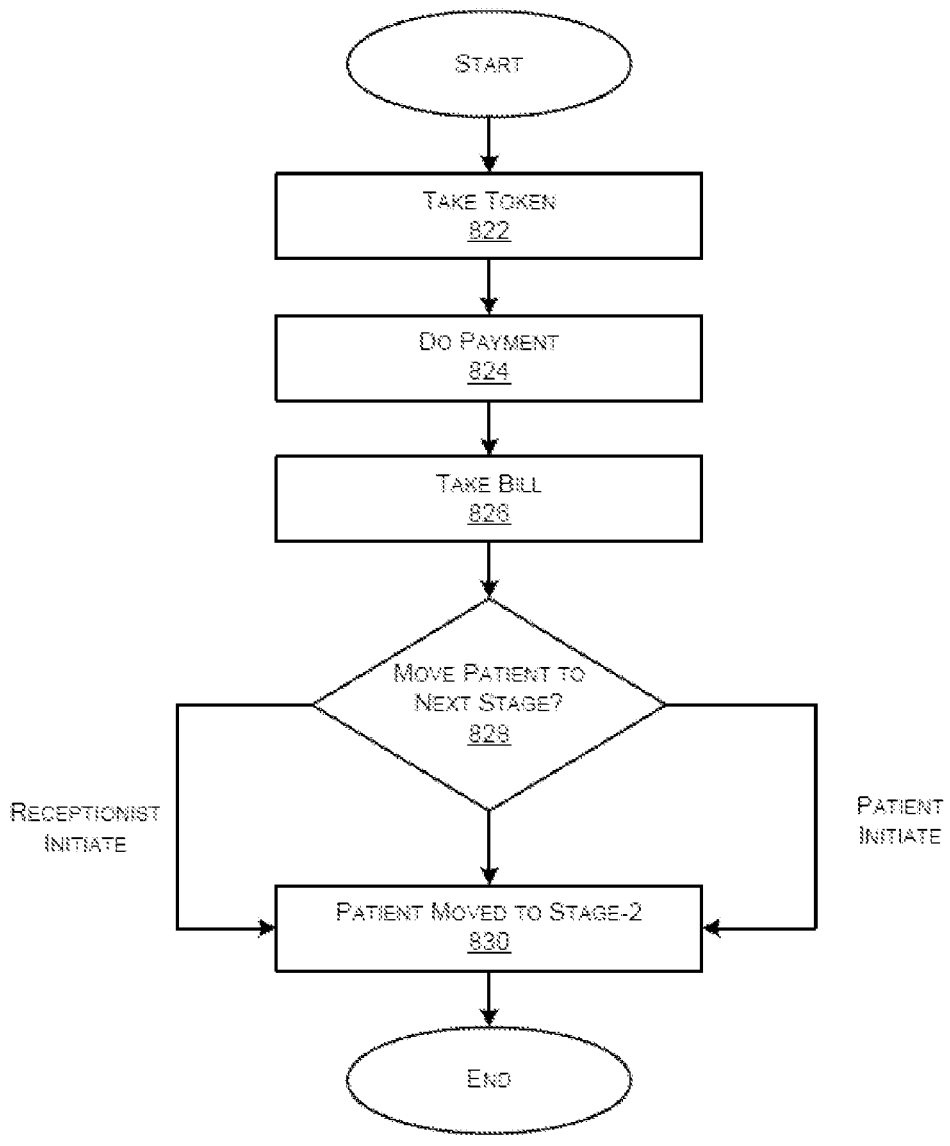

FIGS. 8A-8C illustrate exemplary flow diagrams representing workflow creation, joining and usage, in accordance with an embodiment of the present disclosure.

As illustrated in FIG. 8A, in an aspect, the creation of the workflow may include at 802 the step of selecting a workflow name for example doctor consultation and at 804, the step of defining workflow stages and names such as stage 1, stage 3, stage 4 and the like. At 806, the creation of the workflow may include the step of defining names of roles for example doctor, nurse receptionist and the like and at 808, the creation of the workflow may include the step of assigning join stage to role names for example doctor joins stage 4, a patient joins stage 1. At 810, the creation of the workflow may include the step of defining role types to each role, for example the doctor is stationary in a stage while a patient passes from stage 1 to stage 4.

As illustrated in FIG. 8B, in an aspect, the usage of the workflow for patient at stage 1 may include at 822 the step of taking a token and at 824, the step of doing a payment, at 826, the step of taking a bill corresponding to the payment and at 828, the step of deciding whether to send the participant such as the patient to the next stage. The decision may be initiated by the receptionist or the patient and the patient may be moved to stage 2 at step 830.

Figure 9:
FIG. 9 illustrates an exemplary representation of an implementation of the workflow, in accordance with embodiments of the present disclosure.
Figure 10A:
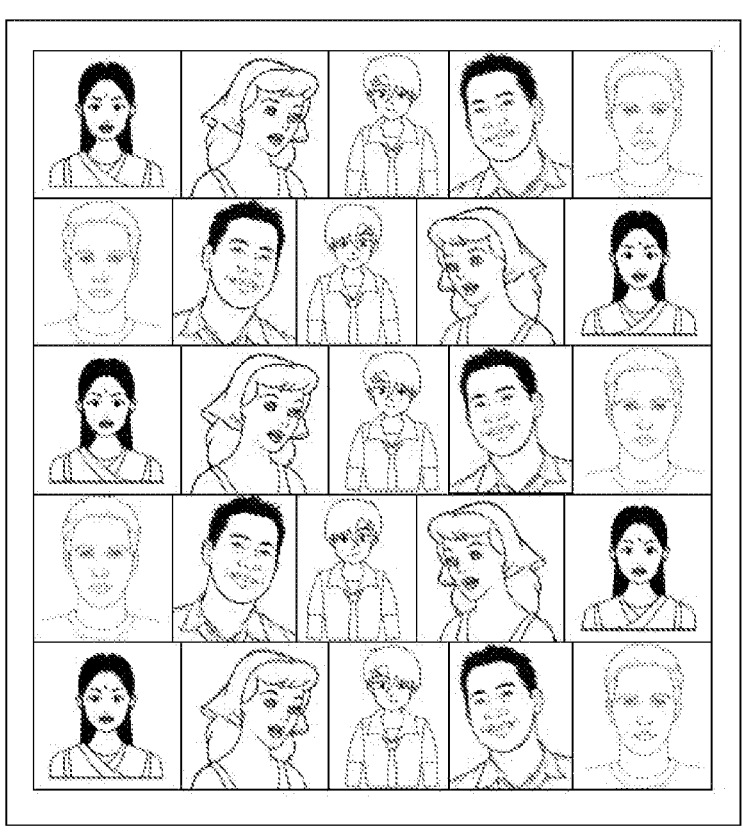
Figure 10B:
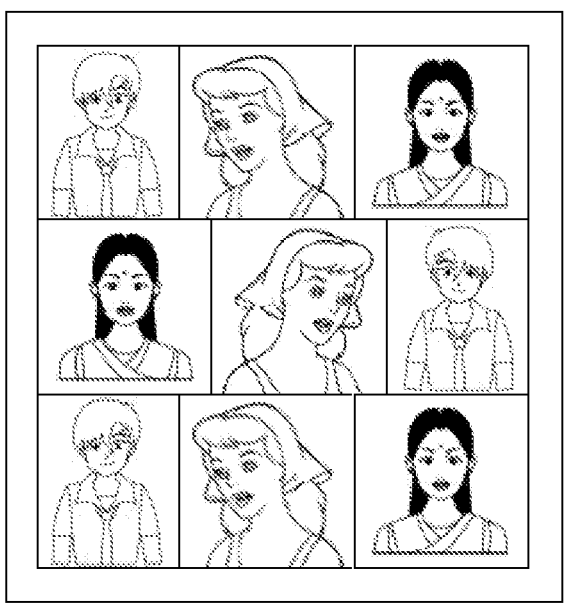
Figure 10E:
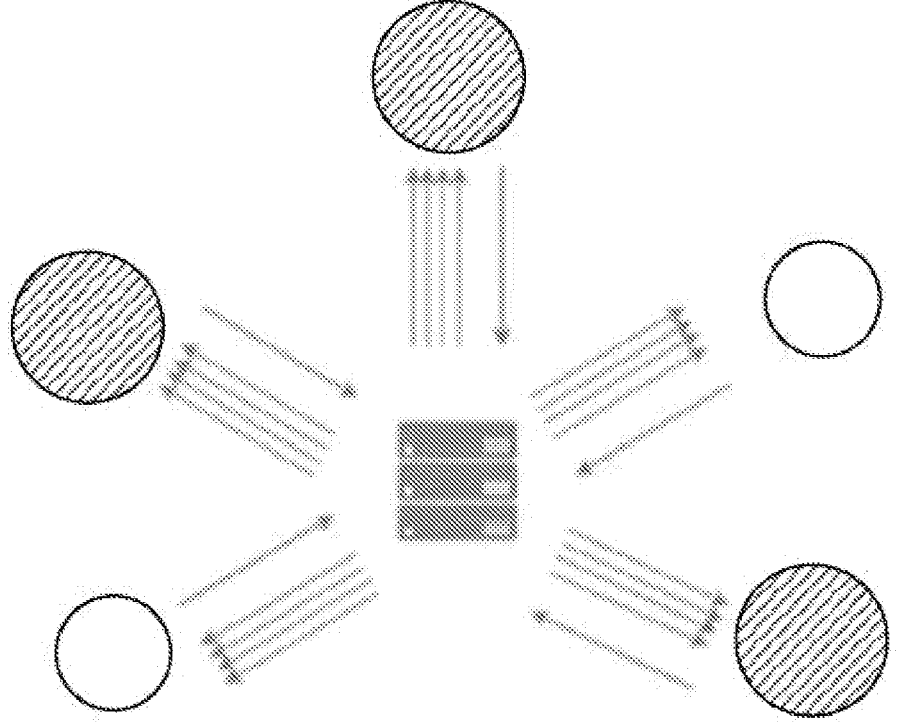

As illustrated in FIG. 8C, in an aspect, the creation of the workflow may include at 802 the step of selecting a workflow name for example doctor consultation and at 804, the step of defining workflow stages and names such as stage 1, stage 3, stage 4 and the like. At 806, the creation of the workflow may include the step of defining names of roles for example doctor, nurse receptionist and the like and at 808, the creation of the workflow may include the step of assigning join stage to role names for example doctor joins stage 4, a patient joins stage 1. At 810, the creation of the workflow may include the FIG. 9 illustrates an exemplary representation of an implementation of the workflow, in accordance with embodiments of the present disclosure.

FIGS. 10A-10E illustrate representations of the existing workflow, in accordance with embodiments of the present disclosure.

Figure 11:
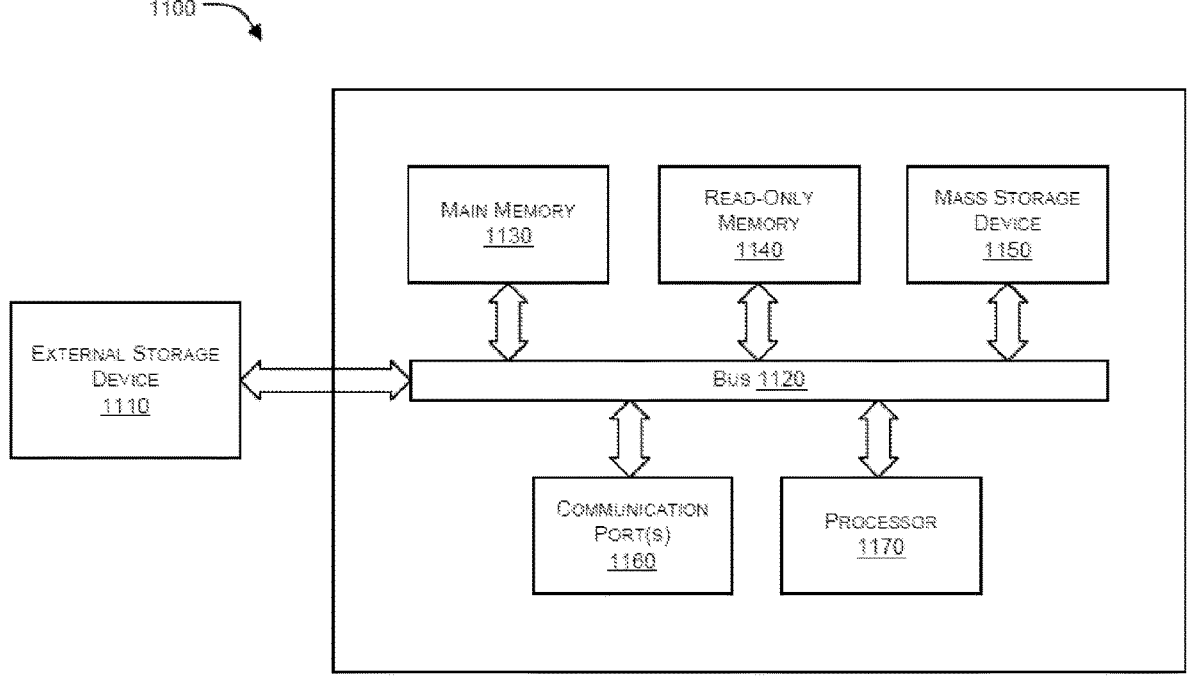
FIG. 11 refers to the exemplary computer system in which or with which embodiments of the present invention can be utilized, in accordance with embodiments of the present disclosure.

FIG. 11 illustrates an exemplary computer system in which or with which embodiments of the present invention can be utilized in accordance with embodiments of the present disclosure. As shown in FIG. 11, computer system 1100 can include an external storage device 1110, a bus 1120, a main memory 1130, a read only memory 1140, a mass storage device 1150, communication port 1160, and a processor 1170. A person skilled in the art will appreciate that the computer system may include more than one processor and communication ports. Examples of processor 1170 include, but are not limited to, an Intel® Itanium® or Itanium 2 processor(s), or AMD® Opteron® or Athlon MP® processor(s), Motorola® lines of processors, Forti-SOC™ system on chip processors or other future processors. Processor 1170 may include various modules associated with embodiments of the present invention. Communication port 1160 can be any of an RS-232 port for use with a modem based dialup connection, a 10/100 Ethernet port, a Gigabit or 10 Gigabit port using copper or fiber, a serial port, a parallel port, or other existing or future ports. Communication port 1160 may be chosen depending on a network, such a Local Area Network (LAN), Wide Area Network (WAN), or any network to which computer system connects. Memory 1130 can be Random Access Memory (RAM), or any other dynamic storage device commonly known in the art. Read-only memory 1140 can be any static storage device(s) e.g., but not limited to, a Programmable Read Only Memory (PROM) chips for storing static information e.g., start-up or BIOS instructions for processor 1170. Mass storage 1150 may be any current or future mass storage solution, which can be used to store information and/or instructions. Exemplary mass storage solutions include, but are not limited to, Parallel Advanced Technology Attachment (PATA) or Serial Advanced Technology Attachment (SATE) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1120 communicatively couples processor(s) 1170 with the other memory, storage and communication blocks. Bus 1120 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1170 to software system.

Optionally, operator and administrative interfaces, e.g. a display, keyboard, and a cursor control device, may also be coupled to bus 1120 to support direct operator interaction with a computer system. Other operator and administrative interfaces can be provided through network connections connected through communication port 1160. The external storage device 1110 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system and method that facilitates easy transition of call for a participant with multiple people involved with a workflow without disconnecting the call The present disclosure provides for a system and method that facilitates efficient interaction of a participant across multiple stages based on the privileged role assigned.

The present disclosure provides for a system and method that facilitates efficient interaction of a plurality of participants who are workflow service users with each other as in real world.

The present disclosure provides an approach to enhance the user experience in case of workflow based conference by making use of spatial conference techniques.

The present disclosure provides an approach to assign roles based privilege where a conference user interacts with other sub groups in the conference.

I claim:

1. A system for enhancing a spatial conference call, said system comprising a processor that executes a set of executable instructions stored in a memory, upon execution of which, the processor causes the system to:

receive, from a plurality of computing devices associated with respective conference participants, a set of data packets pertaining to the respective conference participants;

extract, through an artificial intelligence (AI) engine, a set of attributes from said set of data packets, wherein said set of attributes correspond to media stream associated with the conference participants;

identify, through the AI engine, two or more stages, wherein the conference participants are associated with said two or more stages through roles assigned to the respective conference participants, wherein each stage of the two or more stages corresponds to a predefined task associated with the conference participants;

assign, by the AI engine, privileged roles to at least a first conference participant and at least a second conference participant, wherein said privileged roles are assigned to control access to said two or more stages, the assignment being performed automatically based on said media stream of respective conference participants and real-time queries being generated by the conference participants in view of their respective roles;

initiate, by the AI engine, a peep action authorized to the first conference participant, wherein the peep action is an access request that, upon authorization, enables the first conference participant to temporarily access, from a first stage of the two or more stages, a second stage of the two or more stages, and wherein the first conference participant peeps into the second stage based on the assigned roles and authorization of the peep action; and based on said initiation of the peep action, and said extraction of the set of attributes, render a spatial effect by the AI engine onto the set of attributes, wherein the spatial effect comprises adjusting audio effects of the media stream associated with the conference participants of the second stage, and wherein said set of attributes are processed based on a set of signalling criteria and the authorized peep action.

2. The system as claimed in claim 1, wherein said set of attributes corresponding to said media stream comprise any or a combination of audio data, video data and conference related data.

3. The system as claimed in claim 1, wherein, upon a confirmed assignment of said privileged roles to said first and second conference participants, said system transmits a first set of data packets indicative of said confirmation of assignment of said conference participants, in response to which, computing devices of said first and second conference participants transmit a second set of data packets indicative of acknowledgement of said confirmation.

4. The system as claimed in claim 1, wherein the first and the second conference participants with the assigned privileged roles enter a pre-defined stage among said two or more stages based on a set of pre-defined rules, and wherein remaining conference participants without privileged roles participate in all said two or more stages.

5. The system as claimed in claim 1, wherein the roles are assigned to the respective conference participants based on a set of pre-defined role requirement rules.

6. The system as claimed in claim 1, wherein a media mixer server is operatively coupled to the system and wherein said media mixer server is configured to combine said media stream associated with said respective conference participants into a single media stream.

7. The system as claimed in claim 1, wherein, upon a request for initiation of said peep action by said at least the first conference participant, said system transmits a third set of data packets indicative of request for initiation of the peep action by the first conference participant, in response to which, a computing device of the first conference participant transmits a fourth set of data packets indicative of acknowledgement of said request.

8. The system as claimed in claim 1, wherein the conference participants of the first stage interact with other conference participants of said first stage and wherein said conference participants of the second stage interact with other conference participants of said second stage.

9. The system as claimed in claim 8, wherein the first conference participant of the first stage interacts with at least a second conference participant of the second stage through initiation of the peep action by the first conference participant and wherein said first conference participant returns to said first stage after completion of the peep action.

10. The system as claimed in claim 9, wherein upon authorization of the peep action initiated by the first conference participant for said second stage, said conference participants of said second receive media stream pertaining to the first conference participant initiating the peep action.

11. The system as claimed in claim 10, wherein once the peep action is authorized for the first conference participant for said second stage, the media stream in said second stage changes, wherein effects associated with media stream for said plurality of conference participants of said second stage reduce and wherein effects associated with media stream of said first conference participant for said second stage increase.

12. A method for enhancing a spatial conference call, said method comprising:

receiving, from a plurality of computing devices associated with respective conference participants, a set of data packets pertaining to the respective conference participants;

extracting, through an artificial intelligence (AI) engine, a set of attributes from said set of data packets, wherein said set of attributes correspond to media stream associated with the conference participants;

identifying, through the AI engine, two or more stages, wherein the conference participants are associated with the two or more stages through roles assigned to the respective conference participants, wherein each stage of the two or more stages corresponds to a predefined task associated with the conference participants;

assigning, by the AI engine, privileged roles to at least a first conference participant and at least a second conference participant, wherein said privileged roles are assigned to control access to said two or more stages, the assignment being performed automatically based on said media stream of respective conference participants and real-time queries being generated by the conference participants in view of their respective roles;

initiating, by the AI engine, a peep action authorized to the first conference participant, wherein the peep action is an access request that, upon authorization, enables the first conference participant to temporarily access, from a first stage of the two or more stages, a second stage of the two or more stages, and wherein the first conference participant peeps into the second stage based on the assigned roles and authorization of the peep action; and based on initiation of the peep action, and said extraction of the set of attributes, rendering spatial effect by the AI engine onto the set of attributes, wherein the spatial effect comprises adjusting audio effects of the media stream associated with the conference participants of the second stage, and wherein said set of attributes are processed based on a set of signalling criteria and the authorized peep action.

13. The method as claimed in claim 12, wherein said set of attributes corresponding to said media stream comprise any or a combination of audio data, a video data and conference related data.

14. The method as claimed in claim 12, wherein, upon a confirmed assignment of said privileged roles to said first and second conference participants, said method transmits a first set of data packets indicative of said confirmation of assignment of said conference participants, in response to which, computing devices of said first and second conference participants transmit a second set of data packets indicative of acknowledgement of said confirmation.

15. The method as claimed in claim 12, wherein the first and the second conference participants with the assigned privileged roles enter a pre-defined stage among said two or more stages based on a set of pre-defined rules, and wherein remaining conference participants without privileged roles participate in all said two or more stages.

16. The method as claimed in claim 12, wherein the roles are assigned to the respective conference participants based on a set of pre-defined role requirement rules.

17. The method as claimed in claim 12, wherein a media mixer server is operatively coupled to the method and wherein said media mixer server is configured to combine said media stream associated with said respective conference participants into a single media stream.

18. The method as claimed in claim 12, wherein, upon a request for initiation of said peep action by said first conference participant, said method transmits a third set of data packets indicative of request for initiation of the peep action by the first conference participant, in response to which, a computing device of the first conference participant transmits a fourth set of data packets indicative of acknowledgement of said request.

19. The method as claimed in claim 12, wherein said conference participants of the first stage interact with other conference participants of said first stage and wherein said conference participants of the second stage interact with other conference participants of said second stage.

20. The method as claimed in claim 19, wherein the first conference participant of the first stage interacts with at least a second conference participant of the second stage through initiation of the peep action by the first conference participant and wherein said first conference participant returns to said first stage after completion of the peep action.

21. The method as claimed in claim 20, wherein upon authorization of the peep action initiated by the first conference participant for said second stage, said conference participants of said second stage receive media stream pertaining to the first conference participant initiating the peep action.

22. The method as claimed in claim 21, wherein once the peep action is authorized for the first conference participant for said second stage, the media stream in said second stage, wherein effects associated with media stream for said plurality of conference participants of said second stage reduce and wherein effects associated with media stream of said first conference participant for said second stage increase.

23. The system as claimed in claim 1, wherein the system is configured to operate as a Selective Forwarding Unit (SFU), and wherein the system is configured to make individual media streams from each of the conference participants available to computing devices of other conference participants.

24. The system as claimed in claim 1, wherein the AI engine is configured to generate a workflow comprising the two or more stages, wherein generating the workflow comprises:

selecting a workflow name;

defining the two or more stages and associated stage names;

defining a plurality of role names for the conference participants; and assigning a join-stage to each of the plurality of role names, wherein a conference participant joins the assigned join-stage upon entering the spatial conference call.

25. The method as claimed in claim 12, wherein the method comprises operating in a Selective Forwarding Unit (SFU) mode by making individual media streams from each of the conference participants available to computing devices of other conference participants.

26. The method as claimed in claim 12, wherein the method comprises generating a workflow comprising the two or more stages, wherein generating the workflow comprises:

selecting a workflow name;

defining the two or more stages and associated stage names;

defining a plurality of role names for the conference participants; and assigning a join-stage to each of the plurality of role names, wherein a conference participant joins the assigned join-stage upon entering the spatial conference call.

* * * * *